US008827479B2

(12) United States Patent
Kobayashi et al.

(10) Patent No.: US 8,827,479 B2
(45) Date of Patent: Sep. 9, 2014

(54) DISPLAY DEVICE

(75) Inventors: Izushi Kobayashi, Tokyo (JP); Hisao Sakurai, Saitama (JP); Hiroyuki Yanagisawa, Kanagawa (JP); Hisaharu Katou, Aichi (JP); Shigeru Teshigahara, Gifu (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 13/536,652

(22) Filed: Jun. 28, 2012

(65) Prior Publication Data

US 2013/0010462 A1    Jan. 10, 2013

(30) Foreign Application Priority Data

Jul. 4, 2011  (JP) ................................. 2011-147908

(51) Int. Cl.
*G09F 13/04* (2006.01)
*H04N 13/04* (2006.01)
*G02B 27/22* (2006.01)

(52) U.S. Cl.
CPC ...... *G02B 27/2285* (2013.01); *H04N 2213/001* (2013.01); *H04N 13/0409* (2013.01)
USPC .................... 362/97.1; 362/97.3; 362/249.02; 362/231

(58) Field of Classification Search
USPC ......... 362/97.1, 249.01, 249.04, 97.3; 257/98
See application file for complete search history.

(56) References Cited

U.S. PATENT DOCUMENTS 7,498,933 B2 *  3/2009  Pederson ...................... 340/472

FOREIGN PATENT DOCUMENTS

| JP | 2004-177709 | 6/2004 |
| JP | 2005-114771 | 4/2005 |

* cited by examiner

*Primary Examiner* — Ali Alavi
(74) *Attorney, Agent, or Firm* — Rader, Fishman & Grauer PLLC

(57) ABSTRACT

There is provided a display device including a light-emitting element package, in which a plurality of light-emitting elements emitting light of different colors are arranged vertically and horizontally, is disposed on a base substrate having a plane shape in a vertical direction and an arc shape in a horizontal direction.

4 Claims, 11 Drawing Sheets

FIG.11
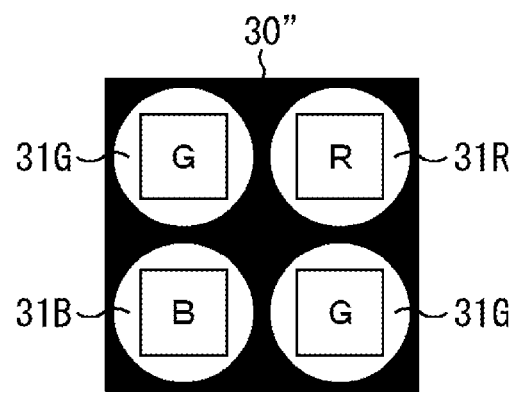
A
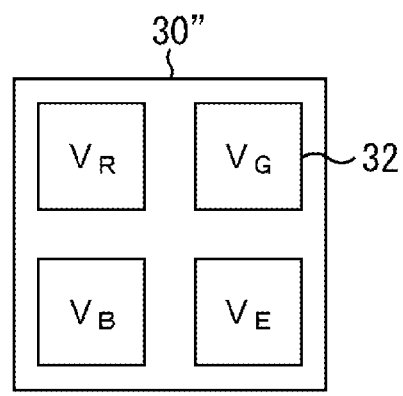
B

DISPLAY DEVICE

BACKGROUND

The present disclosure relates to a display device, for example, to a display device in which a display is configured in an arc-shaped display by a large number of light emitting diodes (LEDs).

In the related art, there are three dimensional display technologies in which a stereoscopic image is displayed on a flat display used in a television receiver or the like. For example, in the three-dimensional display technologies, there is a technology in which parallax of left and right eyes of a human watching a display is used. Specifically, for example, stereoscopic vision may be realized such that only an image for a left eye is watched by the left eye and only an image for a right eye is watched by the right eye by alternately displaying the image for the left eye and the image for the right eye on a flat display and using a polarization filter and the like In contrast, many omnidirectional stereoscopic image display devices have been proposed in which a plurality of images of different perspectives, which are captured from a plurality of perspectives provided on the circumference around a subject (an object to be displayed) (or, are generated assuming a state in which the object is seen by computer graphics from all directions), are used, and a display may be performed such that the object may be stereoscopically visually recognized when seen from any arbitrary direction among all of the directions (for example, refer to Japanese Laid-Open Patent Publication Nos. 2004-177709 and 2005-114771).

Such an omnidirectional stereoscopic image display device has a configuration in which a housing is formed in a cylindrical shape, a display having an arc shape configured by disposing a large number of small light emitting diodes (LEDs) is provided in the inside of the housing, and slits are disposed on the side surface of the housing so that images of the display may be visually recognized from the outside of the housing through the slits. Then, the housing is rotated at high speed by a motor, and thus, when a side surface of the housing having the cylindrical shape is seen from a certain direction by a user, the object to be displayed on the display may be stereoscopically visually recognized.

SUMMARY

When a display having an arc shape is configured by disposing a large number of LEDs, it is desirable to prevent degradation of an image (such as occurrence of streaks, etc.) due to arrangement intervals of LEDs to thus improve productivity and enable LEDs to be replaced.

In consideration of the above situation, in the present disclosure, a display having an arc shape is configured by disposing a large number of LEDs to enable degradation of an image due to arrangement intervals of LEDs to be prevented and thus improve productivity and enable LEDs to be replaced.

According to an embodiment of the present disclosure, a display device may be configured such that a light-emitting element package in which a plurality of light-emitting elements emitting light of different colors are arranged vertically and horizontally, and the light-emitting element package is disposed on a base substrate having a plane shape in a vertical direction and an arc shape in a horizontal direction.

The display device may be configured such that a vertical arrangement interval d1 is different from a horizontal arrangement interval d2 in the light-emitting element package that is disposed on the base substrate before bending into the arc shape.

The display device may be configured such that the vertical arrangement interval d1 and the horizontal arrangement interval d2 satisfy d2>d1.

The display device may be configured such that the vertical arrangement interval d1 and the horizontal arrangement interval d2 satisfy d2<d1.

The display device may be configured such that a mounting part is disposed on a rear surface of the base substrate on which the light-emitting element package is disposed, and the base substrate is bent at a position at which the mounting part is not disposed.

According to an embodiment of the present disclosure, when a display having an arc shape is configured by disposing a large number of LEDs, it is possible to prevent degradation of an image due to arrangement intervals of LEDs to thus improve productivity and enable LEDs to be replaced.

BRIEF DESCRIPTION OF THE DRAWINGS

FIG. 11 is an appearance view illustrating another configuration example of an LED package;

DETAILED DESCRIPTION OF THE EMBODIMENT(S)

Hereinafter, preferred embodiments of the present disclosure will be described in detail with reference to the appended drawings.

1. Embodiment

[Configuration Example of Omnidirectional Stereoscopic Image Display Device]

Figure 1:
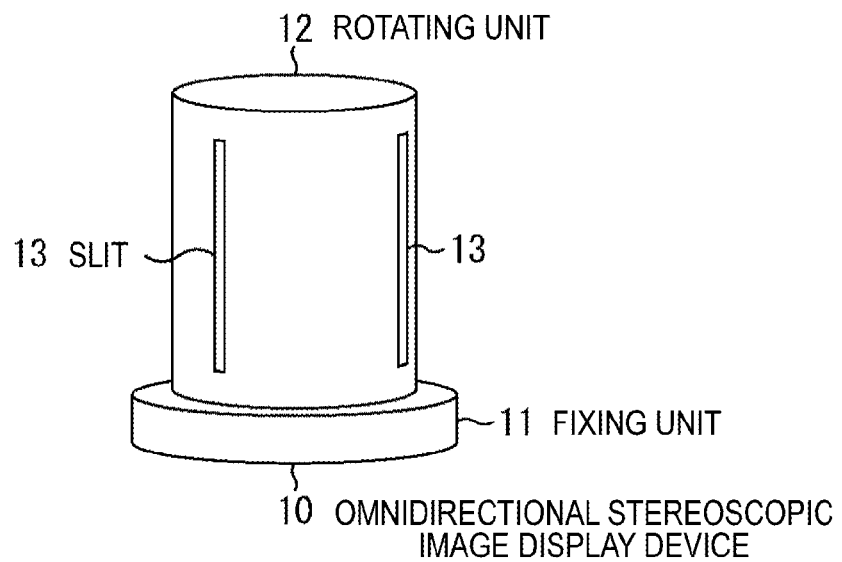
FIG. 1 is an appearance view illustrating an omnidirectional stereoscopic image display device according to an embodiment of the present disclosure.

FIG. 1 is an appearance view illustrating an omnidirectional stereoscopic image display device according to an embodiment of the present disclosure. The omnidirectional stereoscopic image display device 10 includes a fixing unit 11 that is a pedestal and a rotating unit 12 that has a cylindrical shape and rotates at high speed.

In the omnidirectional stereoscopic image display device 10, an object that may be stereoscopically visible to a user watching the rotating unit 12 that rotates at high speed from any direction appears (is displayed) on an inside center of the rotating unit 12.

The fixing unit 11 has a sufficient weight that the omnidirectional stereoscopic image display device 10 does not move even when the rotating unit 12 rotates at high speed. A plurality of slits 13 are provided on the cylindrical side of the rotating unit 12, and displays 21 are provided on the inside of the rotating unit 12 in the same number as the slits 13. In this embodiment, three of the slits 13 and the displays 21 are provided, but the numbers are not limited thereto.

Figure 2:
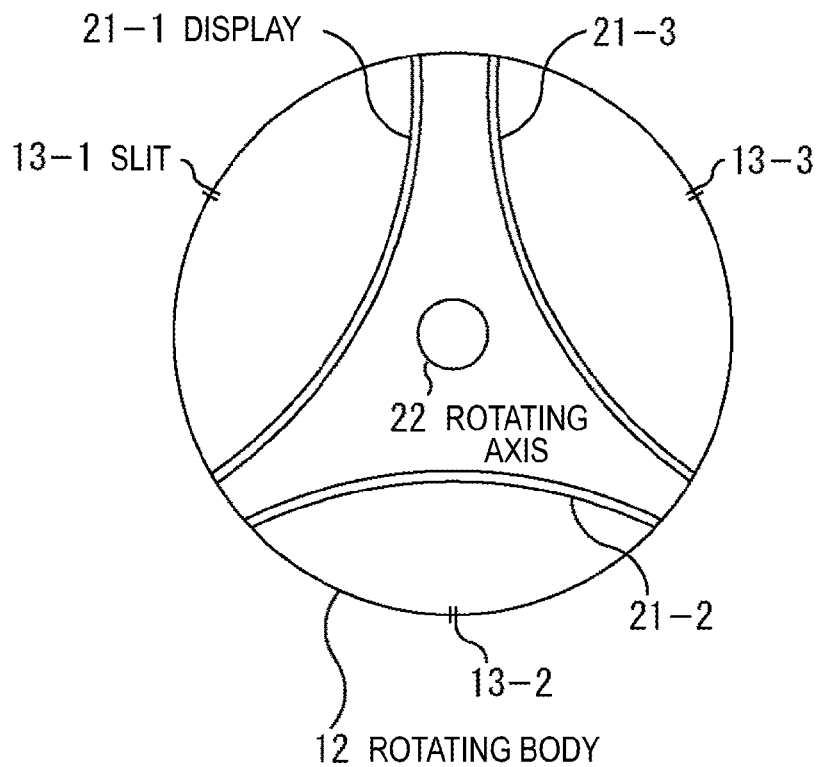
FIG. 2 is a horizontal cross-sectional view illustrating an omnidirectional stereoscopic image display device.

FIG. 2 shows a horizontal cross-section of a rotating unit 12.

Displays 21-1 to 21-3 formed on an arc around the rotating axis 22 are provided on the inside of the rotating unit 12. A large number of small LEDs are disposed on a display surface of each display 21. Images of the displays 21-$i$ ($i$=1, 2, 3) are visible from an outside of the rotating unit 12 through the slits 13-$i$.

In addition, the LEDs disposed on the display surface of each display 21 are disposed in units of LED packages in which LEDs having a predetermined primary color are disposed at predetermined positions and configured to have predetermined numbers, rather than as single LEDs. When the LEDs are disposed as LED package units, productivity of the display 21 is improved and replacement of products when there are defective products or failure in LEDs is easy, in comparison to the LEDs being disposed as single LEDs.

[Configuration of LED Package]

Figure 3:
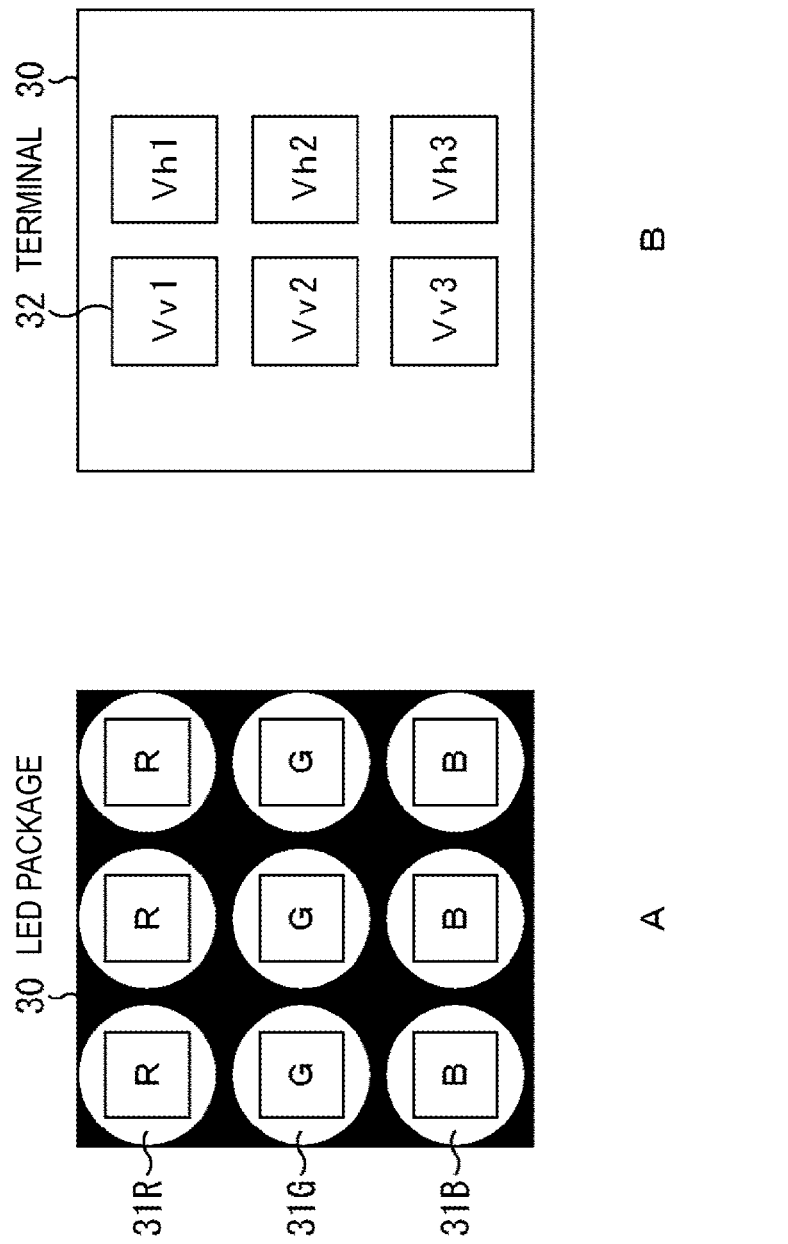
FIG. 3 is an appearance view illustrating a configuration example of an LED package.

FIG. 3 shows an example of an LED package configuration in which (A) and (B) show a top surface and a rear surface, respectively. As shown in FIG. 3(A), an LED package 30 has a 3×3 array in which LEDs 31R, 31G and 31B of respective R, G and B colors are disposed in threes at constant intervals with the same colors in a horizontal direction and different colors in a vertical direction. The LED package 30 including nine LEDs has six terminals at the rear thereof.

Figure 4:
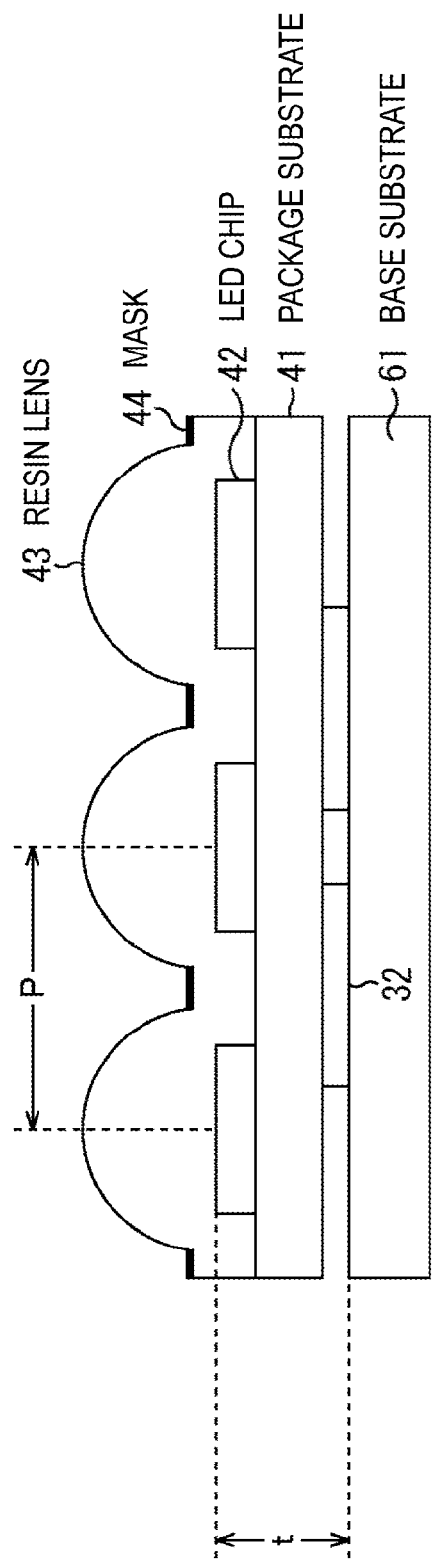
FIG. 4 is a cross-sectional view of an LED package.

FIG. 4 shows a cross-section of an LED package 30. In the LED package 30, resin lenses 43 centered on LED chips 42 provided on the package substrate 41 are formed to cover the LED chips 42. In addition, although not shown, wires connected to the package substrate 41 are provided on the LED chips 42, and a resin coating of the same material as the resin lenses 43 is formed on the wires. Alternatively, a flip-chip may be used instead of the wires. A mask 44 is provided on the topmost surface of the LED package 30 so as to cover portions other than the resin lenses 43 with, for instance, a black gloss-free metal. In addition, a reflector may be provided on the side surface of the LED chips 42 so as to reflect light from the LED chips 42. Further, in FIG. 4, P shows a mounting interval, and t shows a height from a base substrate of the display 21 to a light-emitting surface.

Figure 5:
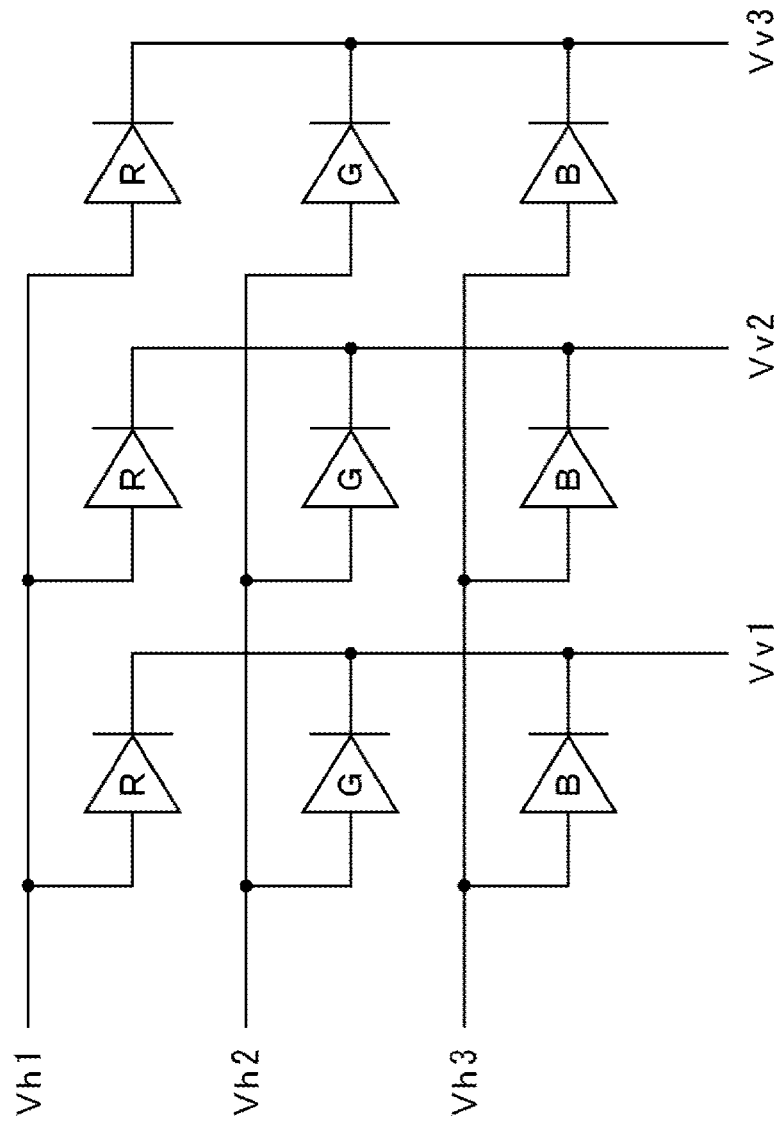
FIG. 5 is a wiring diagram of an LED package.

FIG. 5 shows a wiring diagram of an LED package 30. As shown in FIG. 5, the number of the terminals is the sum of the number of LEDs in the vertical direction and the number of LEDs in horizontal direction. Thus, the LED package 30 in FIG. 5 includes six terminals.

In addition, based on the LED package 30 of FIG. 3, the LED package may be configured of a plurality of connected LED packages.

Figure 6:
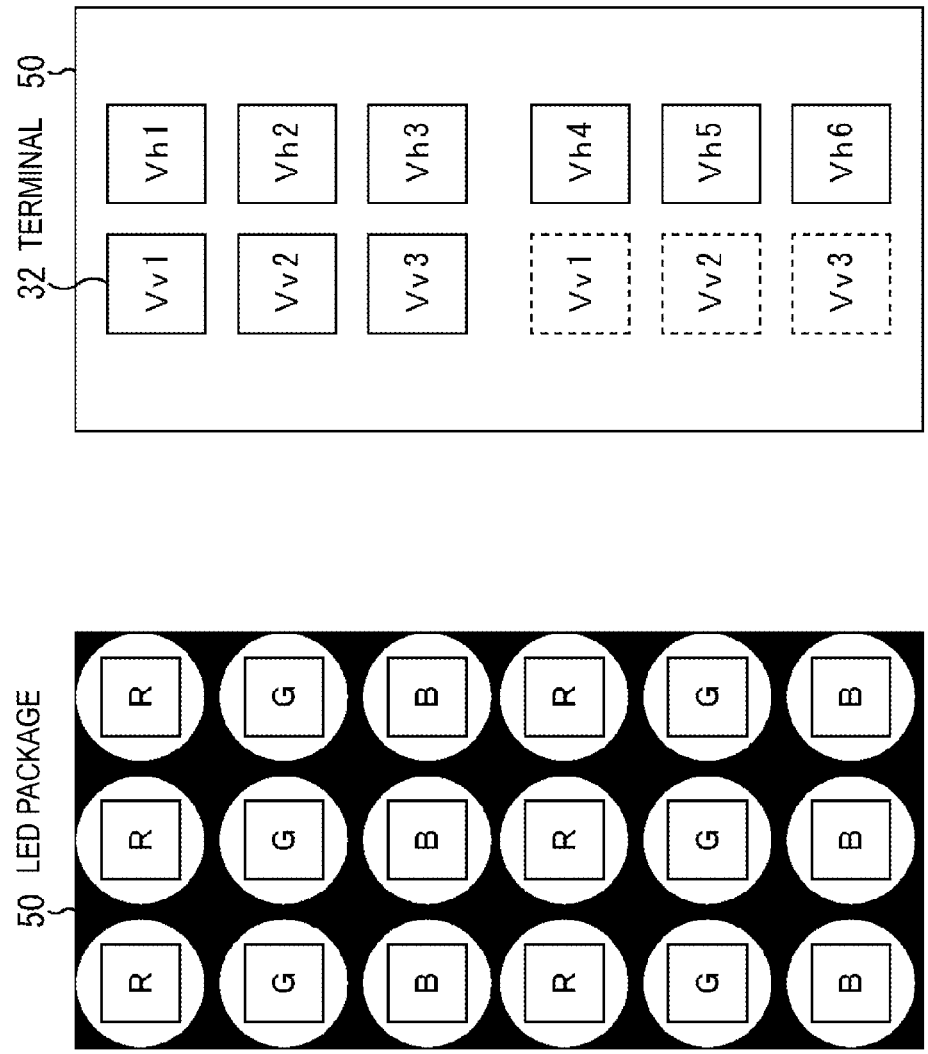
FIG. 6 is an appearance view illustrating another configuration example of an LED package.

FIG. 6 shows an LED package 50 in which two LED packages 30 are connected vertically, and 6(A) and 6(B) show a top surface and a rear surface, respectively. In the LED package 50, 18 LEDs may be driven by power from 9 terminals shown in solid lines. However, a total of 12 terminals may be provided, in which three terminals indicated in dotted lines are also further mounted in consideration of stability of solder mounting, reduction in wiring resistance, and weight balance in the event of rotation.

Figure 7:
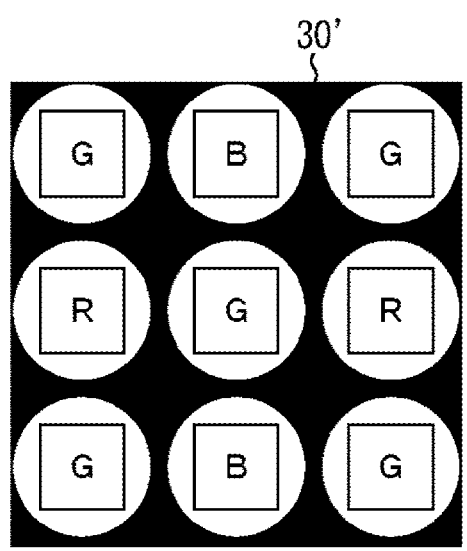
FIG. 7 is an appearance view illustrating another configuration example of an LED package.

In addition, the arrangement of respective colors in the LED package 30 is not limited to the example in FIG. 3. For example, it may be a Bayer array such as that shown in an LED package 30' of FIG. 7. In addition, although not shown in the drawings, it may be a tilted array such as GBR from the upper left, RGB from the middle left, and BRG from the lower left. Alternatively, it may be possible to adopt three primary colors other than R, G and B. In addition, it may be possible to configure an LED package using four primary colors.

[Arrangement of LED Package in Display]

Figure 8:
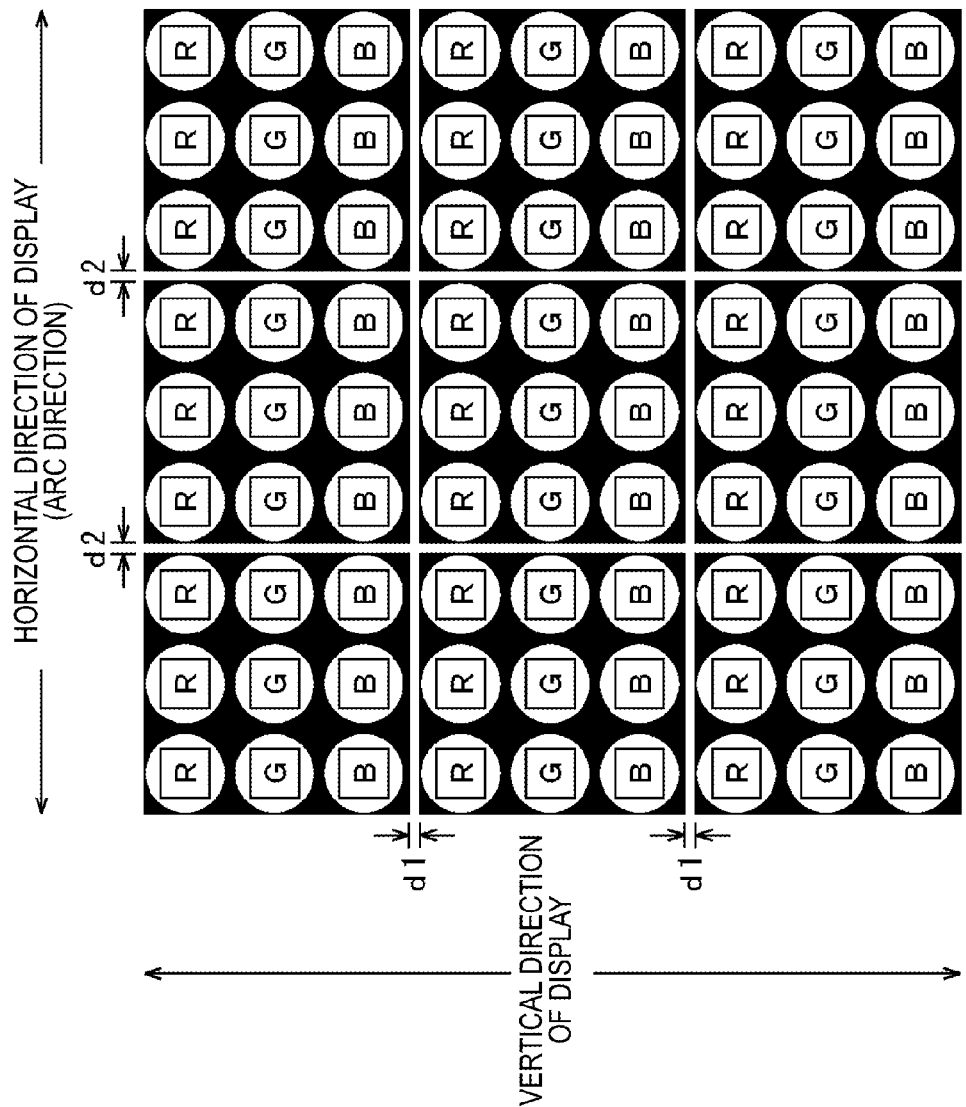
FIG. 8 is a view illustrating distances between LED packages.

FIG. 8 shows an arrangement of an LED package 30 before a base substrate of a display is bent into an arc shape. As shown in FIG. 8, in a display 21, a vertical arrangement interval of an LED package 30 is set to d1, and a horizontal arrangement interval is set to d2. The vertical arrangement interval d1 may be the same interval as a mounting interval of each LED 31 in the LED package 30. The horizontal arrangement interval d2 should be wider than the vertical arrangement interval d1, that is, d2>d1 should be satisfied, in consideration of the fact that the base substrate of display 21 will be bent into the arc shape.

The horizontal arrangement interval d2 of the LED package 30 in the display 20 will be described in detail.

Figure 9:
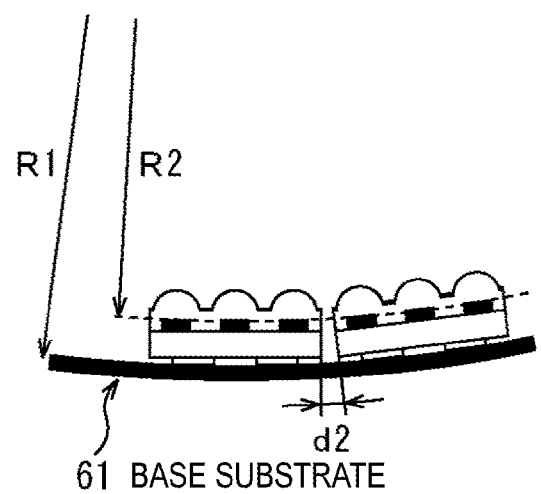
FIG. 9 is a view illustrating distances between LED packages.

FIG. 9 shows a case in which a mounting part (for example, an IC chip), which affects a bending position of the base substrate, is not disposed on an opposite surface of the base substrate of the display 21 on which the LED package 30 is disposed. In this case, the arrangement interval d2 is subject to the following Equation (1).

[Equation 1]

$$d2 \approx d1 + nP\left(\frac{R1 - R2}{R2}\right) \quad (1)$$

d2: the horizontal arrangement interval d2 (a value when the base substrate is not bent)
n: numbers of LEDs of the LED package 30 in the horizontal direction (in this case, n=3)
P: a mounting interval of the LED 31
R1: a bending radius of the base substrate
R2: a radius of a bending surface on which a light-emitting surface of the LED is formed.

Figure 10:
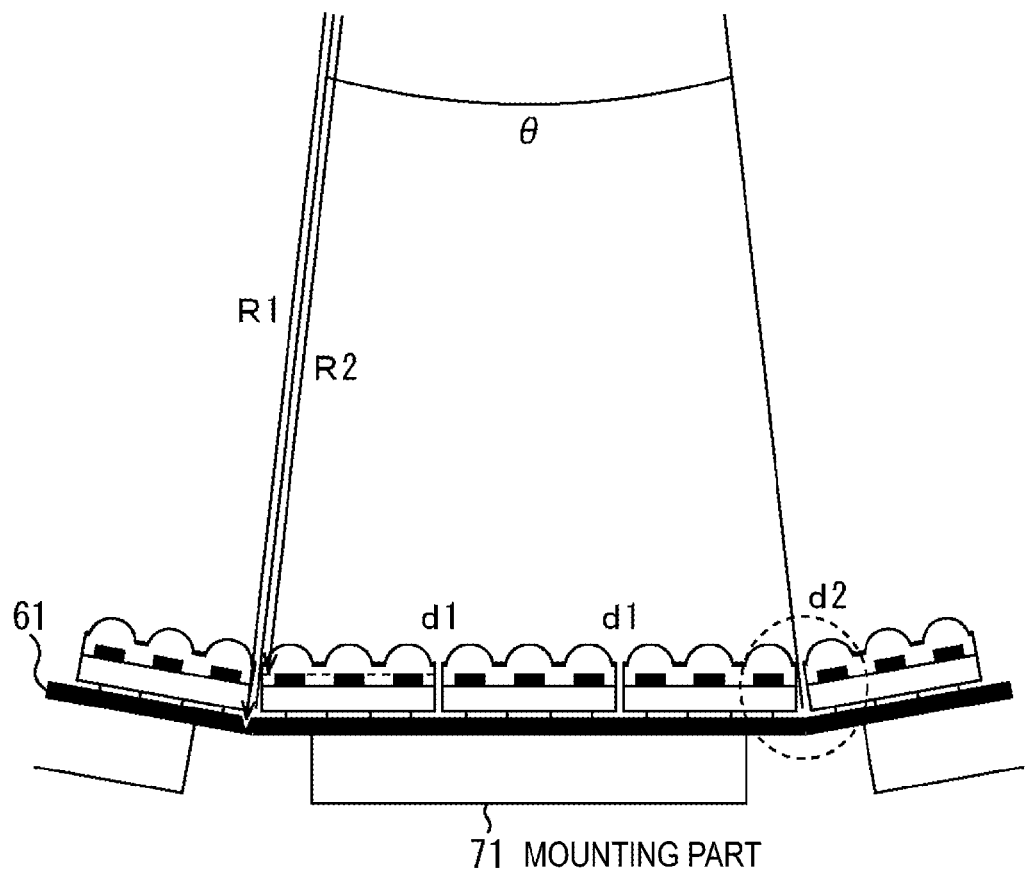
FIG. 10 is a view illustrating distances between LED packages.

FIG. 10 shows a case in which mounting parts (for example, IC chips), which affect bending positions of the base substrate, are disposed on an opposite surface of the base substrate of the display 21 on which the LED package 30 is disposed. In the case of FIG. 10, one mounting part is disposed for three LED packages 30 in the horizontal direction. If the base substrate is bent only at a position at which the mounting part is not disposed such that the horizontal interval is wide only at the bent portion, the arrangement interval d2 is subject to the following Equation (2). In this case, the horizontal interval other than at the bent portion is set to the same interval as the vertical arrangement interval d1.

[Equation 2]

$$d2 \approx d1 + P\left(\frac{1}{\cos\frac{\theta}{2}} - 1\right) + 2(R1 - R2)\tan\frac{\theta}{2} \quad (2)$$

θ: an angle of a line drawn in the bent portion of the base substrate from the center of the bending of the base substrate As described above, it is possible to prevent degradation of the image, for example, in which vertical streaks are generated from the image of the display, by determining the horizontal arrangement interval d2 of the LED package 30.

Modified Example

The LED package may be configured of four LEDs in a 2×2 array. FIG. 11 shows a configuration example of an LED package 30", and (A) and (B) show a top surface and a rear surface, respectively. The LED package 30" is configured of four LEDs including GR from the upper left and BG from the lower left. Terminals $V_G$, $V_R$, and $V_B$ applying voltages to LEDs of respective colors and a terminal $V_E$ connecting each LED to a ground are provided on the rear surface. Two LED packages 30" may be connected vertically and packaged.

In the present embodiment, the LED package is disposed on the inside of the base substrate having an arc shape, but the disclosure may be applied to a case in which the LED package is disposed on the outside of the base substrate having the arc shape. However, in this case, it is necessary to satisfy d2<d1, in contrast to the embodiment described above.

Figure 12:
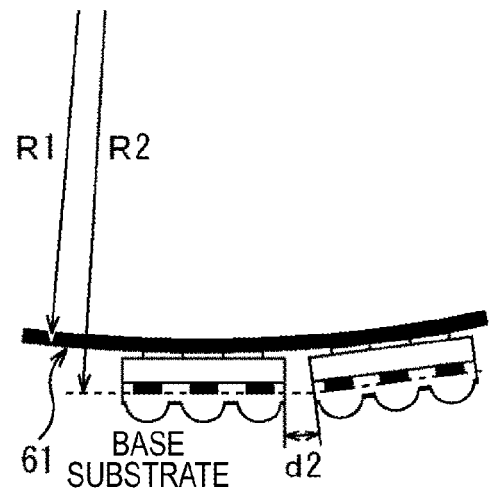
FIG. 12 is a view illustrating distances between LED packages.

For example, FIG. 12 shows a case in which mounting parts (for example, IC chips) which affect bending positions of the base substrate are not disposed on an opposite surface of the base substrate of the display 21 on which the LED package 30 is disposed. In this case, the arrangement interval d2 is subject to Equation (1).

Figure 13:
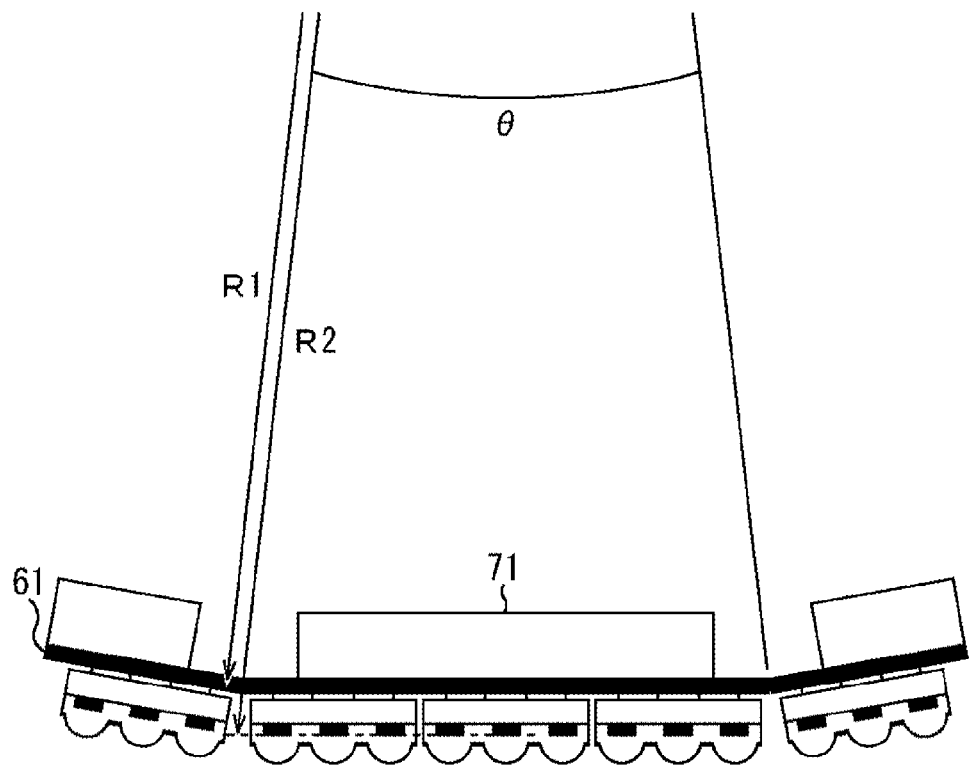
FIG. 13 is a view illustrating distances between LED packages.

In addition, for example, FIG. 13 shows a case in which mounting parts 71 which affect bending positions of the base substrate are disposed on an opposite surface of the base substrate of the display 21 on which the LED package 30 is disposed. In the case of FIG. 13, one mounting part is disposed for three LED packages 30 in the horizontal direction. If the base substrate is bent only at a position at which the mounting part is not disposed such that the horizontal interval is wide only at the bent portion, the arrangement interval d2 is subject to Equation (2).

Additionally, although the stereoscopic 3D image is displayed from all directions in this embodiment, it is also possible to display a 2D image from all directions. Alternatively, all of the directions may be divided into a plurality of numbers, and information (time, news, an advertisement, a guide, or the like) having the different divided numbers may be displayed at the same time.

The embodiments of the present disclosure are not intended to be limited to those described above, and various modifications can be made without departing from the spirit and scope of the present disclosure The present disclosure contains subject matter related to that disclosed in Japanese Priority Patent Application JP 2011-147908 filed in the Japan Patent Office on Jul. 4, 2011, the entire content of which is hereby incorporated by reference.

What is claimed is:

1. A display device wherein:
    a light-emitting element package, in which a plurality of light-emitting elements emitting light of different colors are arranged vertically and horizontally, is disposed on a base substrate having a plane shape in a vertical direction and an arc shape in a horizontal direction,
    wherein a vertical arrangement interval d1 is different from a horizontal arrangement interval d2 in the light-emitting element package that is disposed on the base substrate.

2. The display device according to claim 1, wherein the vertical arrangement interval d1 and the horizontal arrangement interval d2 satisfy d2>d1.

3. The display device according to claim 1, wherein the vertical arrangement interval d1 and the horizontal arrangement interval d2 satisfy d2<d1.

4. The display device according to claim 1, wherein a mounting part is disposed on a rear surface of the base substrate on which the light-emitting element package is disposed, and the base substrate is bent at a position at which the mounting part is not disposed.

* * * * *